United States Patent
Hirata (10) Patent No.: US 7,549,010 B2
(45) Date of Patent: Jun. 16, 2009

(54) COMMUNICATION APPARATUS AND METHOD

(75) Inventor: Takashi Hirata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 11/497,389

(22) Filed: Aug. 2, 2006

(65) Prior Publication Data

US 2007/0038695 A1     Feb. 15, 2007

(30) Foreign Application Priority Data

Aug. 11, 2005    (JP) .............................. 2005-233336

(51) Int. Cl.
*G06F 13/36* (2006.01)
(52) U.S. Cl. ................... 710/315; 709/246; 714/747
(58) Field of Classification Search ................. 710/315; 709/204–206, 246; 714/747, 797
See application file for complete search history.

(56) References Cited

U.S. PATENT DOCUMENTS

| | | | | |
|---|---|---|---|---|
| 4,377,145 A | * | 3/1983 | Nagaishi | 123/494 |
| 4,377,807 A | * | 3/1983 | Freeman | 341/2 |
| 4,829,519 A | * | 5/1989 | Scotton et al. | 714/708 |
| 5,809,016 A | * | 9/1998 | Kreitzer et al. | 340/7.44 |
| 6,006,254 A | * | 12/1999 | Waters et al. | 709/205 |
| 6,078,785 A | * | 6/2000 | Bush | 455/7 |
| 6,381,241 B1 | * | 4/2002 | Ghirnikar et al. | 370/394 |
| 6,611,937 B1 | * | 8/2003 | Kadyk et al. | 714/747 |
| 2005/0265334 A1 | * | 12/2005 | Koguchi | 370/389 |
| 2007/0032888 A1 | | 2/2007 | Hirata et al. | |

FOREIGN PATENT DOCUMENTS

JP    8-88672    4/1996

OTHER PUBLICATIONS

Pirak et al. An Adaptive Protocol for Cooperative Communications Achieving Asymptotic Minimum Symbol-Error Rate. ICASSP 2006.*
Mathew et al. JERIM-320: A New 320-bit Hash Function Compared to Hash Functions with Parallel Branches. International Journal of Computer Science and Applications. vol. 5, No. 4, pp. 11-25, 2008.*
Ju et al. EasiPC: A Packet Compression Mechanism for Embedded WSN. Proceedings of the 11th IEEE International Conference on Embedded and Real-Time Computing Systems and Applications. IEEE 2005.*
U.S. Appl. No. 11/539,108, filed Oct. 5, 2006.

* cited by examiner

*Primary Examiner*—Mark Rinehart
*Assistant Examiner*—Matthew D Spittle
(74) *Attorney, Agent, or Firm*—Fitzpatrick, Cella, Harper & Scinto (57) ABSTRACT

A communication apparatus communicates a first message via a network, extracts a difference between the first message and a second message that has been received, and applies the extracted difference to further communication.

13 Claims, 8 Drawing Sheets

GET/HTTP/1.1
Accept-Language: ja
User-Agent:   OriginalBrowser/1.0
Connection: Keep-Alive

FIG. 3B

HTTP/1.1 400 Bad Request
Date: Web,15 Dec 2004 10:00:01 GMT
Server: OriginalServer/1.0
Content-Length: 0
Connection: close

FIG. 3C get/HTTP/1.1
Accept-Language: ja
User-Agent:   OriginalBrowser/1.0
Connection: Keep-Alive

| MONITORING TIME | Web, 15 Dec 2004 10:00:20 |
|---|---|
| ADDRESS OF TRANSMISSION SOURCE | 192.168.0.3 |
| ADDRESS OF TRANSMISSION DESTINATION | 192.168.0.4 |
| PORT OF TRANSMISSION SOURCE | 12345 |
| PORT OF TRANSMISSION DESTINATION | 80 |
| DIFFERENCE | diff GetMessage<br>1c1<br><GET/HTTP/1.1<br>...<br>>get/HTTP1.1 |

COMMUNICATION APPARATUS AND METHOD

BACKGROUND OF THE INVENTION

1. Field of the Invention

The present invention relates to a communication apparatus and method.

2. Description of the Related Art

Owing to advances in electronic computer techniques, even office equipment and ordinary household appliances that conventionally have only a single function and cannot be interconnected organically are now capable of implementing functions whereby they are coupled through a network and execute processing in cooperation. Device control protocols such as UPnP (Universal Plug and Play), Jini and Jxta are known as network techniques for implementing the merging of such device controllers through a network.

Next, UPnP will be described as a typical example of a device control protocol. Specifically, UPnP is a device control protocol used on a network that supports the protocols set forth below. That is, IP (Internet Protocol), TCP (Transmission Control Protocol) and UDP (User Datagram Protocol) are available. Also available are HTTP (HyperText Transport Protocol) and XML (eXtensible Markup Language), etc.

With UPnP, the SSDP (Simple Service Discover Protocol) is used to discover a device controller connected over a network. Further, SSDP is used also to ascertain profile information that expresses previously defined specifications and settings of a device controller that is the object of control.

By way of example, "Device capable of reproducing a digital video stream?" is broadcast. In this case, a device that meets this requirement transmits an IP address and host name autonomously to the source of the inquiry. At this time there is an exchange of the previously defined specifications and settings of the device controller that is to be controlled, specifically profile information such as the kind of functions possessed.

Further, SOAP (Simple Object Access Protocol) is used in controlling a device. SOAP is an RPC-based Internet communication industry standard that has been agreed upon in order to smoothen an exchange of XML and Web services. A control message is transmitted to a device using SOAP, and a result or an error is acquired. A UPnP control request is a SOAP message that includes an action for designating and calling a parameter. The response also is a SOAP message that includes status. It sends back a value and a parameter.

A device control protocol typified by UPnP used to interconnect devices through a network has its specifications decided in order to assure interconnectivity between nodes. These specifications have been put forward by various organizations and issued as recommendations. For example, many Web-related and Web-service-related specifications such as HTTP and SOAP have been put forward by the World-Wide Web Consortium (w3c. Http://www.w3c.ofg). Many Internet-related specifications have been put forward by the Internet Engineering Task Force (IETF, http://www.ietf.org) and have been issued as recommendations.

Various organizations have instituted specifications stringently and vendors who develop device controllers package device control protocols that are fully in line with these specifications. As a result, communications using these device control protocols have all succeeded and interoperability has been acquired. In reality, however, specifications have ambiguity and many are not precise. Consequently, even though it may have been the intent of the vendor of a device controller to package a device control protocol fully in line with specifications, discrepancies in interpretation occur owing to ambiguities in the specifications and there are instances where interoperability is not acquired, thereby resulting in communication failure.

In addition, there are many instances in which packaging is not in line with specifications. Furthermore, if a device controller using a protocol that is not in line with specifications becomes a de facto standard, the following failure can occur: Specifically, even if a device controller using a protocol in line with specifications is developed by a vendor, it will fail to communicate with a device controller that uses a device control protocol that has become the de facto standard. An example in which communication fails is follows: In a certain package, no distinction may be made between upper- and lower-case characters but such a distinction is made in another package. The result can be communication failure. Further, with an XML-related device control protocol such as SOAP, communication may fail depending upon whether or not a name space exists.

Vendors of device controllers make various attempts to enhance interoperability. For example, device control protocols that flow over a network are monitored for discrepancies using a protocol monitor. In another example, a number of vendors bring their products together at one location and conduct communications tests on them. If a discrepancy in the device control protocol is discovered, interoperability is improved by correcting the protocol. One example of a proposal relating to a protocol monitor for discovering discrepancies in a device control protocol involves detecting the location of an error in the device control protocol and enabling the location to be pointed out (e.g., see the specification of Japanese Patent Application Laid-Open No. 8-88672).

However, the measures described in the above-cited specification are implemented before a product is shipped; coping with the problem after shipment is not easy. And even if the above-mentioned expedient of communications testing for the purpose of enhancing interoperability is adopted, gathering together and testing all device controllers presently on the market is not feasible and satisfactory verification will not be achieved. This means that the user of a product is compelled to investigate, prior to purchase, which devices the product of interest has been tested for with regard to communication, search the Internet for product reports and then select the product deemed to offer the highest degree of interoperability. Further, in order to assure interoperability, there are cases where the vendor side must take such measures as having the user upgrade firmware or recalling a product and rewriting the program within the product.

SUMMARY OF THE INVENTION

Accordingly, an object of the present invention is to improve interoperability in a network.

According to the present invention, the foregoing object is attained by providing a communication apparatus comprising: communicating means for communicating a first message via a network; extracting means for extracting a difference between the first message and a second message that has been received by the communicating means; and applying means for applying the difference, which has been extracted by the extracting means, to communication by the communicating means.

Further, according to the present invention, the foregoing object is attained by providing a communication method comprising the steps of: communicating a first message via a network; extracting a difference between the first message and a second message that has been received; and applying the extracted difference to further communication.

Further features of the present invention will become apparent from the following description of exemplary embodiments (with reference to attached drawings).

DESCRIPTION OF THE EMBODIMENTS

An embodiment of the present invention will be described with reference to the drawings. Although a specific embodiment is described below, the present invention is not limited solely to this specific embodiment.

Figure 1:
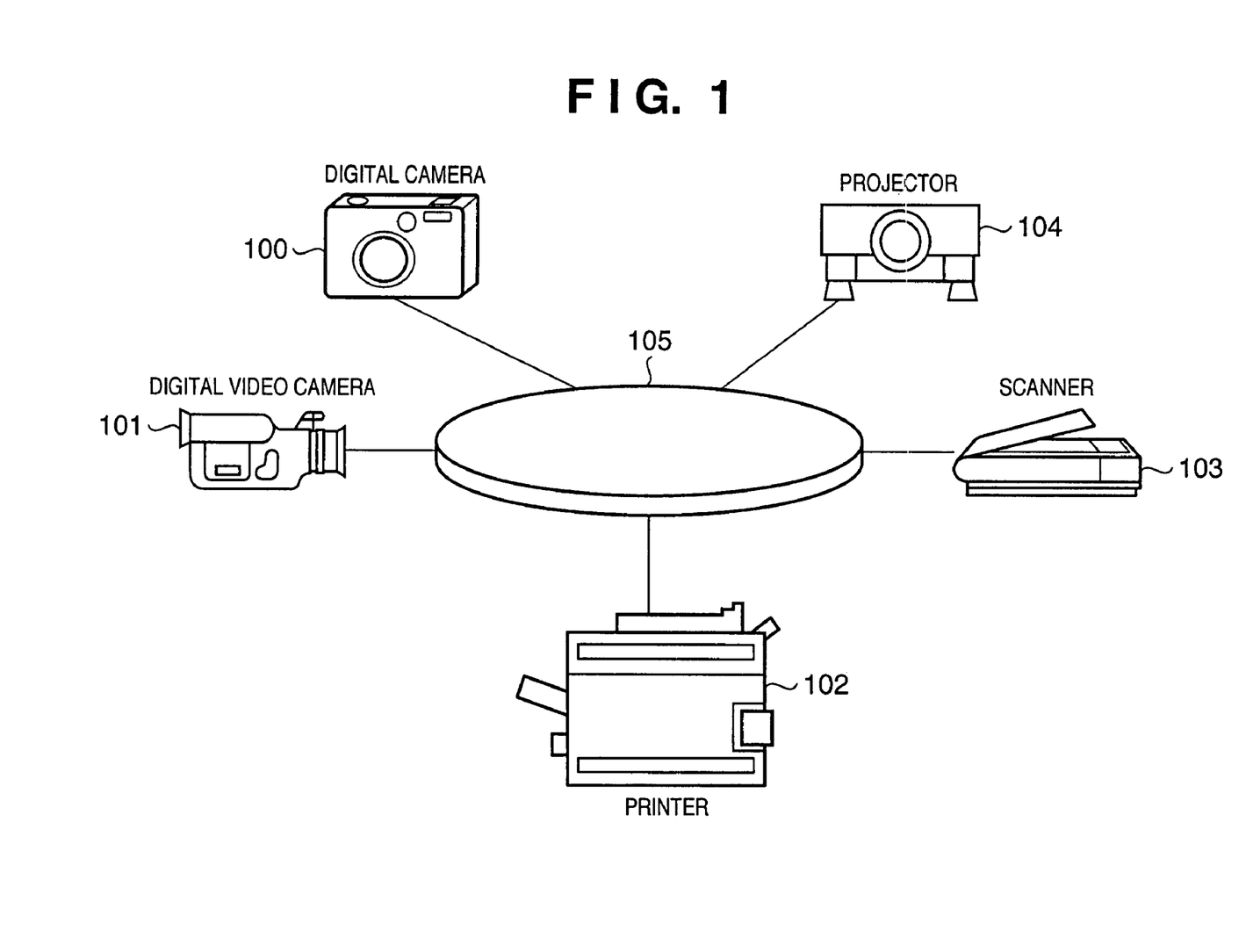
FIG. 1 is a diagram illustrating the overall configuration of a network system according to an embodiment of the present invention.

FIG. 1 is a diagram illustrating the overall configuration of a network system according to an embodiment of the present invention. As illustrated in FIG. 1, a digital camera 100, a digital video camera 101, a printer 102, a scanner 103 and a projector 104 are interconnected via a network 105 in this network system. In this embodiment, an example in which five types of devices are connected to the network 105 is described. However, the invention is not limited to devices solely of these types.

Figure 2:
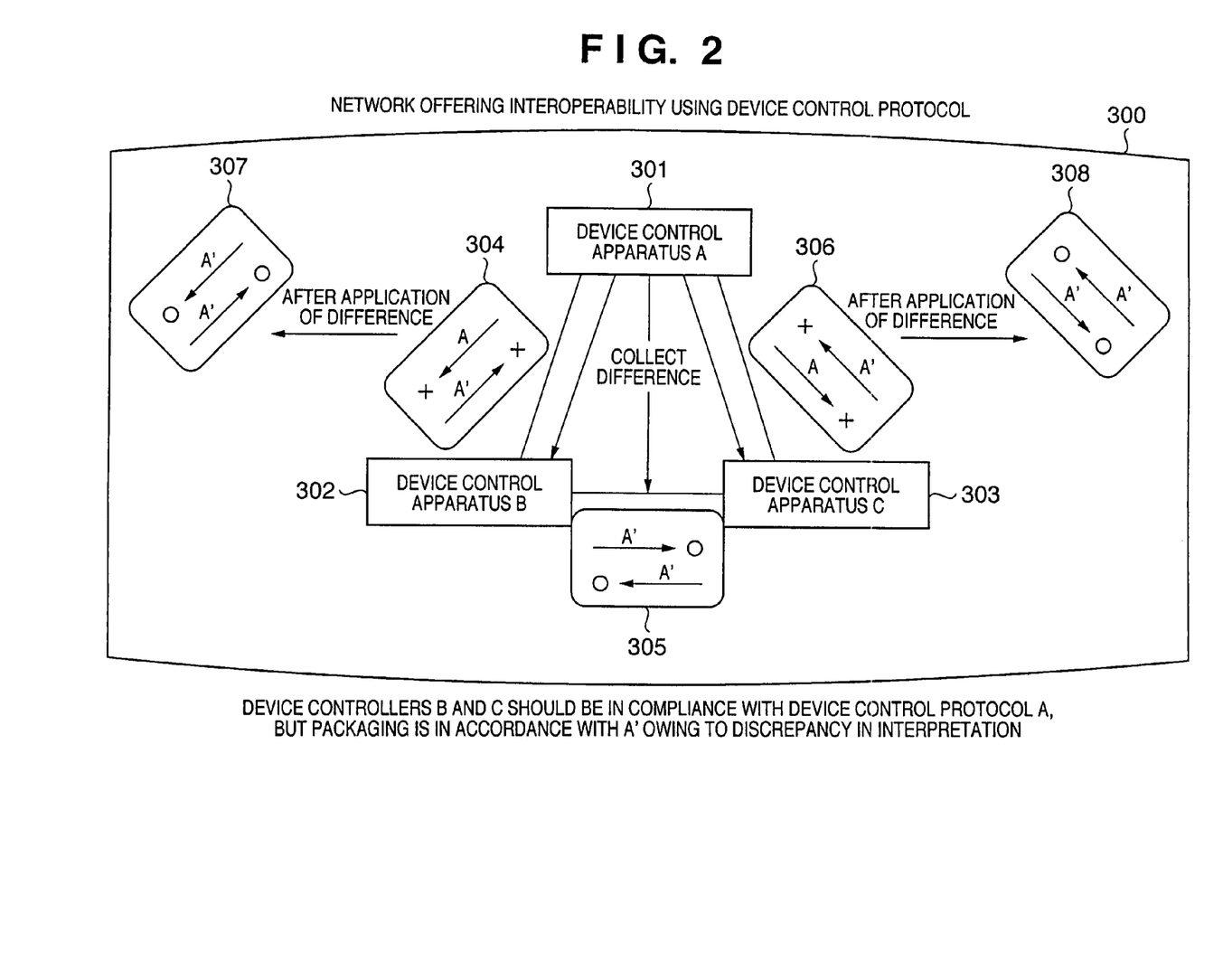
FIG. 2 is a diagram useful in describing an overview of the configuration of the network system according to this embodiment.

FIG. 2 is a diagram useful in describing an overview of the configuration of the network system according to this embodiment. In FIG. 2, a network system 300 comprises a plurality of device controllers compliant with a device control protocol A. Connected as devices within this system are a device controller A (301), a device controller B (302) and a device controller C (303), which are device controllers compliant with device control protocol A. Owing to a misunderstanding that has arisen due to an ambiguity in the specifications of device control protocol A, interoperability of the device controller B (302) and device controller C (303) is assured by a device control protocol A', which is not strictly in compliance with device control protocol A.

In a case such as this, the device controller A (301) monitors a message (304) it receives from the device controller B (302) and a message (306) it receives from the device controller C (303). Further, the device controller A (301) monitors a message (305) communicated between the device controller B (302) and the device controller C (303).

More specifically, the network interface of the device controller A (301) is made to operate in a promiscuous mode, receives all packets that flow over the network 200 and collects communication data. The device controller A (301) analyzes the collected communication data, extracts the difference between the device control protocol A and the device control protocol A' and applies this difference to a device control protocol that can be used by the device controller A (301). As a result, the device controller A (301) becomes capable of performing communication (307) with the device controller B (302) and communication (308) with the device controller C (303) using the device control protocol A', which is the local rule, and it is possible to assure interoperability among the three controllers.

Figure 3A:
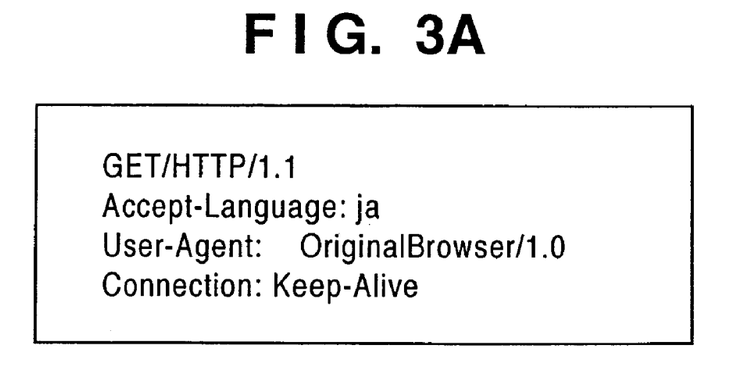
FIG. 3A is a diagram illustrating an example of a communication message according to a device control protocol A that complies with a standard.
Figure 3B:
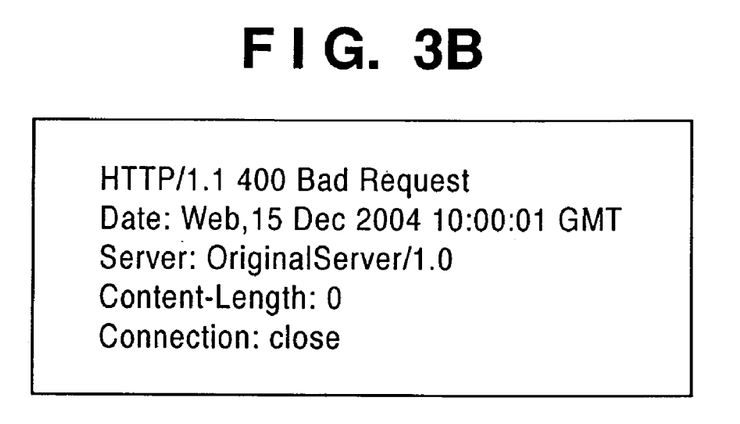
FIG. 3B is a diagram illustrating an example of a reply message when communication based upon the device control protocol A compliant with the standard has failed.
Figure 3C:
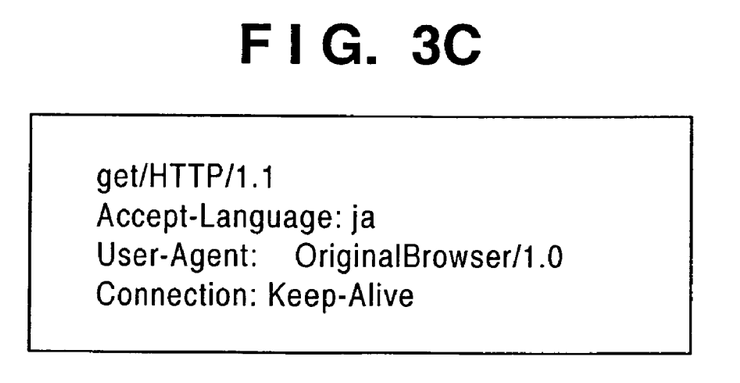
FIG. 3C is a diagram illustrating an example of a communication message according to a device control protocol A' in which there is a strictly trivial difference because of an ambiguity, etc., in specifications.

By way of example, assume that the device control protocol A is "HTTP/1.1". That is, assume that a message shown in FIG. 3A is the device control protocol A and that a message shown in FIG. 3C is the device control protocol A'. In this case, communication (304) between device controller A (301) and device controller B (302) and communication (306) between device controller A (301) and device controller C (303) is as follows: The device that has received the message shown in FIG. 3A or 3C sends back the error message shown in FIG. 3B owing to a discrepancy between upper- and lowercase characters, namely between the character strings "GET" and "get, on the first line. Consequently, in the event that communication fails, the device controller A (301) monitors the message (304) it receives from the device controller B (302) and the message (306) is receives from the device controller C (303) and collects communication data. Further, the device controller A (301) monitors the message (305) communicated between the device controller B (302) and the device controller C (303) and collects communication data.

The device controller A (301) analyzes the collected communication data and extracts the difference between the device control protocol A and the device control protocol A' (e.g., the discrepancy between the character strings "GET" and "get" on the first lines in FIGS. 3A and 3C, respectively). The device controller A (301) applies the difference to the device control protocol that can be used by the device controller A (301). As a result, the device controller A (301) becomes capable of performing communication (307) with the device controller B (302) and communication (308) with the device controller C (303) using the device control protocol A' (FIG. 3C), which is the local rule. It should be noted that in a case where communication is possible, a reply message indicating that communication has succeeded is sent back as a return value. As a result, it is possible to assure interoperability among the three controllers.

Figure 4:
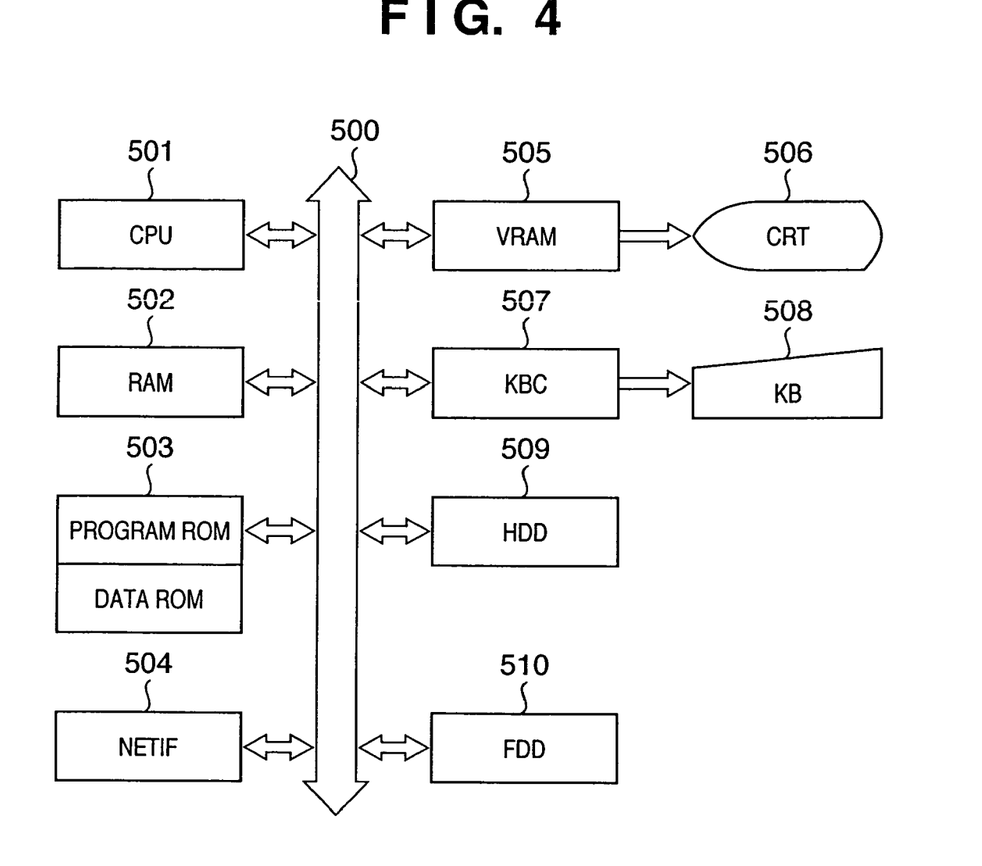
FIG. 4 is a block diagram of a case where a device controller within the network system according to the embodiment of the invention is implemented using a personal computer.

Next, a device controller connected to the network system according to the embodiment will be described. FIG. 4 is a block diagram of a case where a device controller within the network system according to the embodiment of the invention is implemented using a personal computer. It should be noted that the device controller can also be implemented by a work station, notebook personal computer or palmtop personal computer, etc., besides an ordinary personal computer. Further, the device controller can be implemented by various household appliances, such as a TV, which incorporate a computer, game machines having a communication function, terminals having a communication function for communicating with other device controllers inclusive of telephones, facsimile machines, mobile telephones and PDAs, or a combination thereof.

As shown in FIG. 4, the device controller includes a central processing unit (CPU) 501 for controlling the system, and a random-access memory (RAM) 502 that functions as the main memory of the CPU 501, as an area for an execution program, as an area for execution of the program, and as a data area.

The device controller further includes a read-only memory (ROM) 503 for recording the procedure of processing executed by the CPU 501. The ROM 503 includes a program ROM in which is recorded the basic software (operating system) that constitutes the system program for device control in the system, and a data ROM in which information necessary to operate the system has been recorded. There are also cases where a hard-disk drive (HDD), described later, is used instead of the ROM 503.

A network interface (NETIF) 504 exercises control for implementing data transfer with the system via a network, and diagnoses the status of the connection. A video RAM (VRAM) 505 expands an image displayed on the display screen of a display unit 506 that indicates the operating status of the system, and controls the display. The display unit 506 is denoted by a CRT in this embodiment.

A controller 507 controls an input signal from an external input unit 508. The latter allows the user of the system to operate the system and is exemplified by a keyboard, etc.

The hard-disk drive 509 is a storage device used to store an application program and data such as image information. An application program in this embodiment is a software program or the like for implementing various device control means that constitute this embodiment.

An external input/output unit 510 is a removable storage device such as a CD-ROM drive. This is used to read the above-mentioned application program from a medium. It will be assumed below that the unit is a floppy-disk drive (FDD). It should be noted that an application program and data stored in the hard-disk drive 509 can be used upon being stored in the floppy-disk drive 510.

An input/output bus (address bus, data bus and control bus) 500 is for interconnecting the above-mentioned units.

Figure 5:
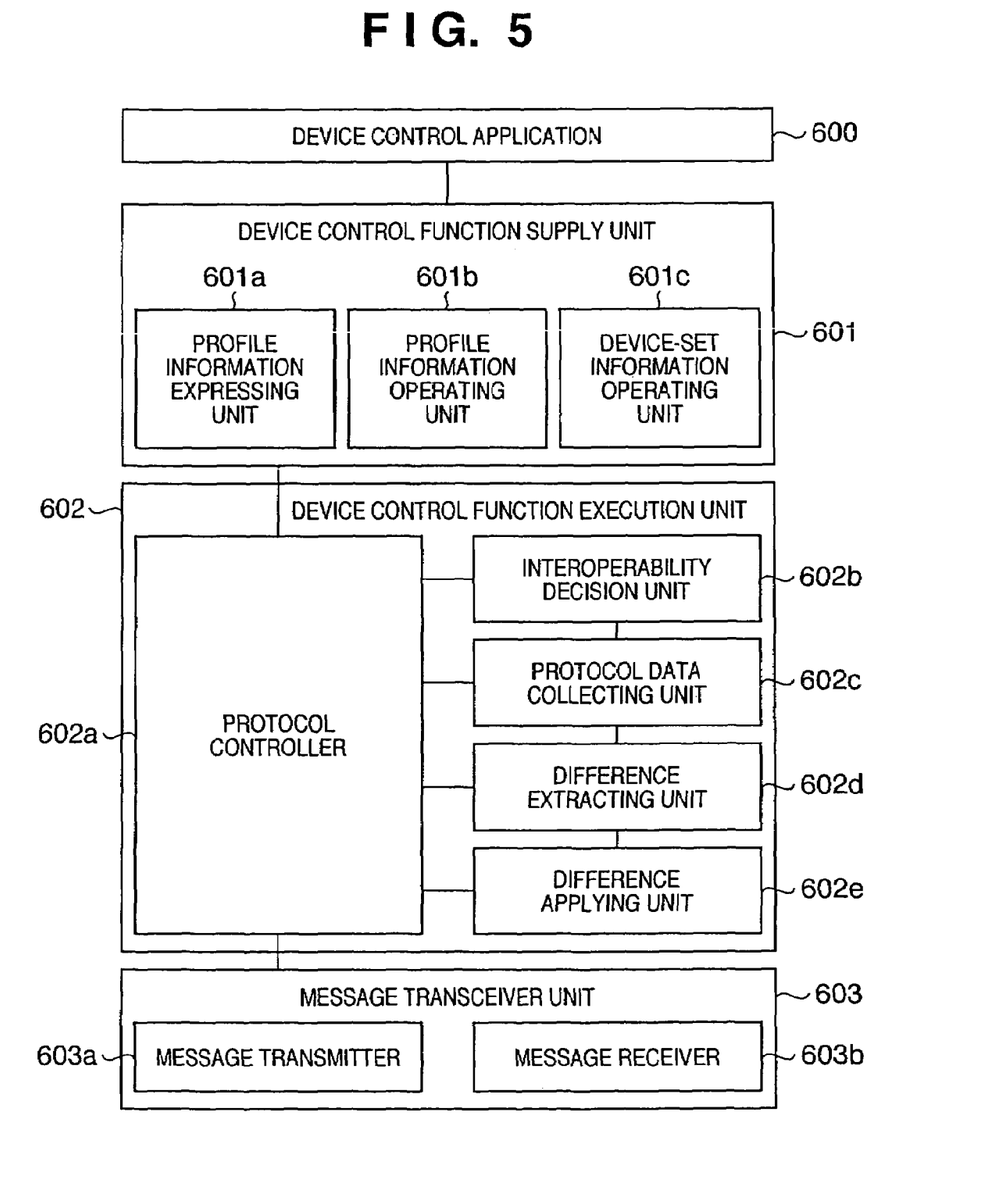
FIG. 5 is a diagram useful in describing the structure of an application module implemented by a device controller according to this embodiment.

FIG. 5 is a diagram useful in describing the structure of an application module implemented by a device controller according to this embodiment.

As illustrated in FIG. 5, a device controller includes a device control application 600, a device control function supply unit 601, a device control function execution unit 602, and a message transceiver unit 603. First, the device control function supply unit 601 has a profile information expressing unit 601a, a profile information operating unit 601b and a device-set information operating unit 601c. The device control function execution unit 602 has a protocol controller 602a, an interoperability decision unit 602b, a protocol data collecting unit 602c, a difference extracting unit 602d and a difference applying unit 602e. Furthermore, the message transceiver unit 603 includes a message transmitter 603a and a message receiver 603b.

Figure 6:
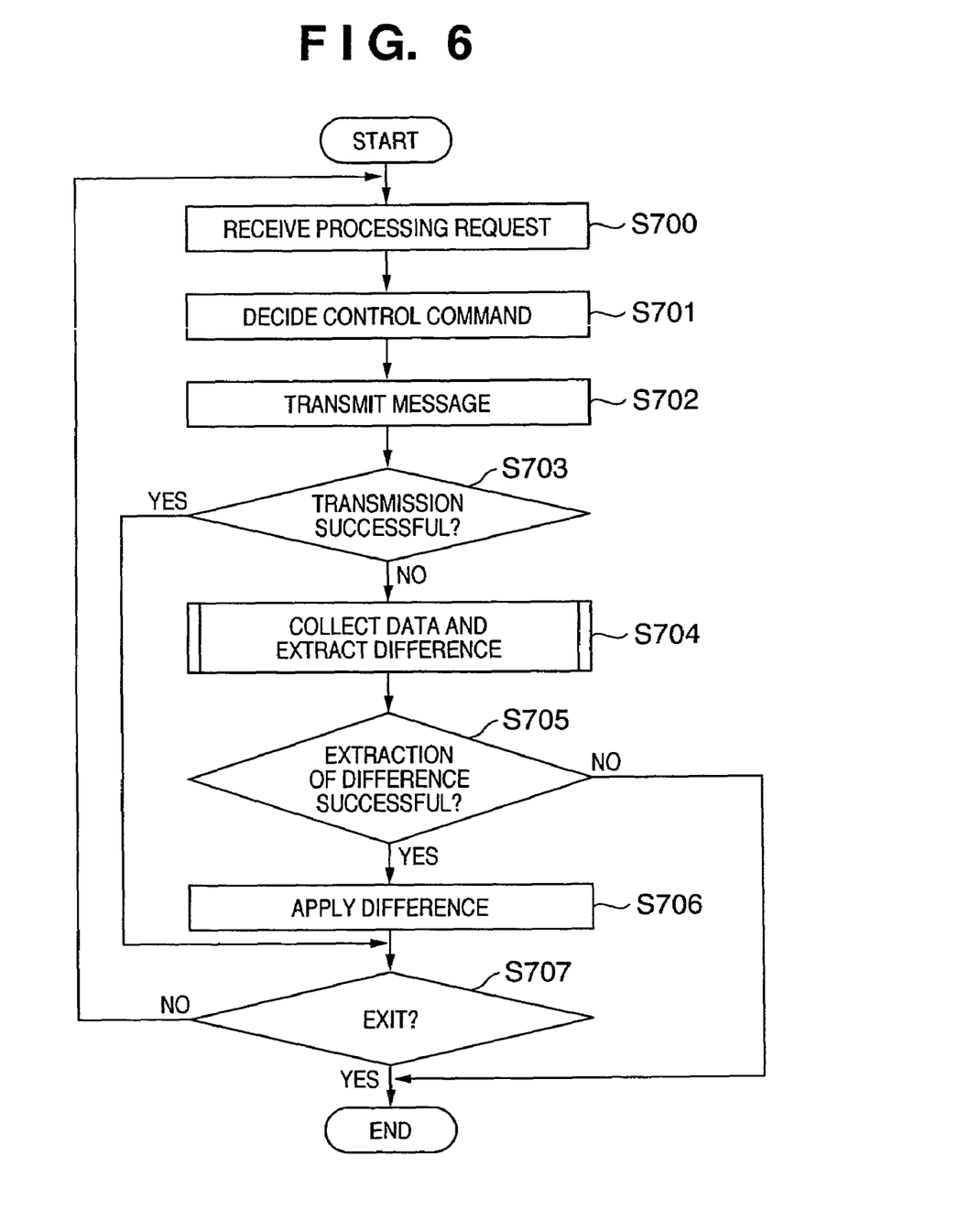
FIG. 6 is a flowchart for describing processing executed in a device controller according to this embodiment.

FIG. 6 is a flowchart for describing processing executed in a device controller according to this embodiment.

First, the device control function supply unit 601 receives a processing request from within the device control application 600 (step S700). Next, the device control function supply unit 601 decides the particulars of control and issues a command to the protocol controller 602a (step S701). The protocol controller 602a transmits a message from a message transmitter 603a to a device controller to be controlled (step S702). It should be noted that when a message is transmitted from the message transmitter 603a, the Internet Protocol (IP) is used. As for the version of the IP in this case, both IPv4 and IPv6 can be used. Further, the medium actually used as communication path can be a wired or wireless path. Depending upon the device control protocol, there are cases where a communication protocol such as TCP, UDP, HTTP, SMTP, SNMP or FTP is used. The interoperability decision unit 602b determines whether transmission of the message has succeeded or not (step S703).

If it is determined from the result of the determination at step S703 that transmission of the message has succeeded ("YES" at step S703), then interoperability has been assured and control therefore proceeds to the processing of step S707. On the other hand, if it is determined at step S703 that transmission of the message has failed ("NO" at step S703), then interoperability has not been assured and therefore control proceeds to step S704.

The protocol data collecting unit 602c and difference extracting unit 602d execute data collection and difference-extraction processing at step S704. The details of the processing at step S704 will be described later with reference to FIG. 7.

Figure 8:
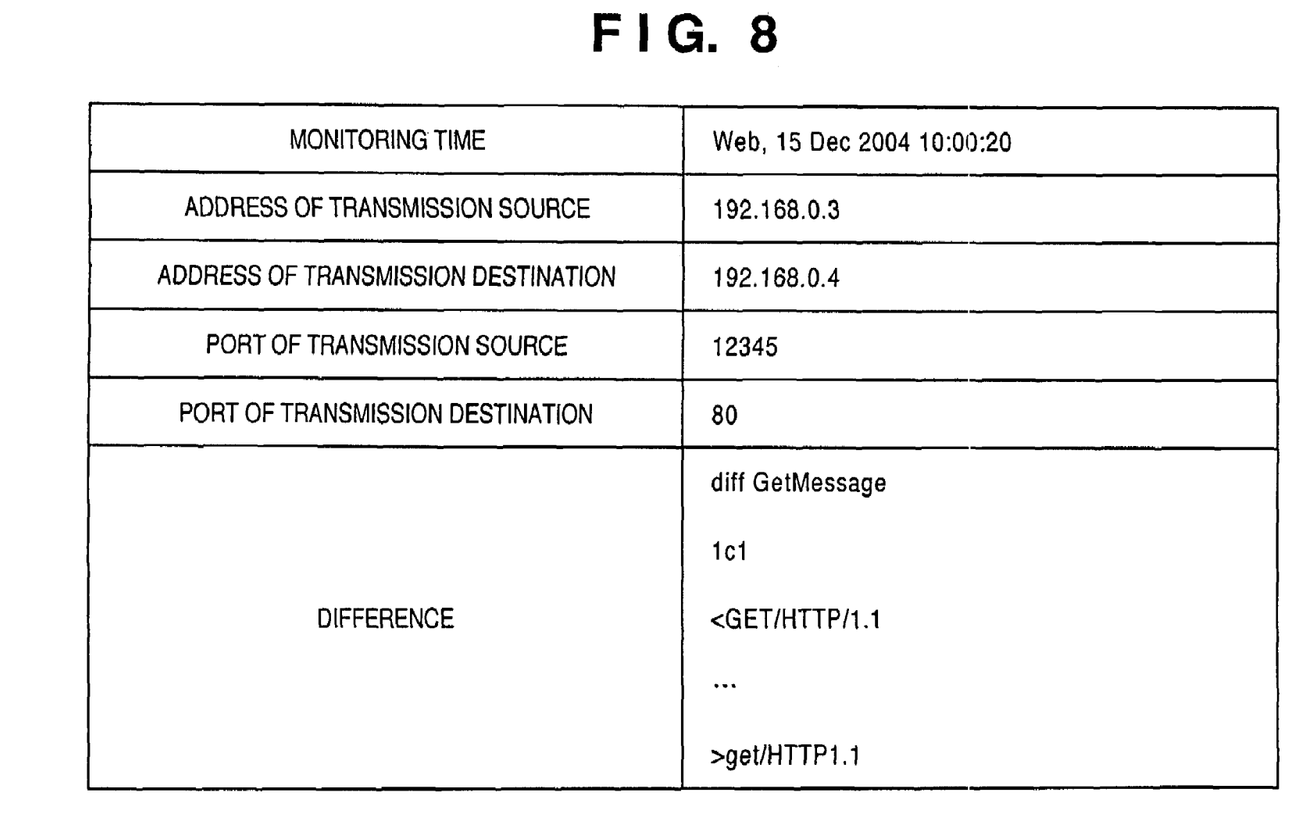
FIG. 8 is a diagram illustrating an example of a table storing extracted difference information.

Following the end of data collection and difference-extraction processing at step S704, whether extraction of the difference has succeeded or not is determined (step S705). If it is determined that difference extraction has succeeded ("YES" at step S705), the difference applying unit 602e applies the extracted difference information, which is illustrated in FIG. 8, to the protocol controller 602a (step S706). Specifically, FIG. 8 is a diagram illustrating an example of a table storing extracted difference information.

This is followed by determining whether the application is to be exited (step S707). If it is determined that the application is to continue ("NO" at step S707), then control proceeds to the processing of step S700. On the other hand, if a "YES" decision is rendered at step S707 with regard to end of processing, then this processing is exited.

It should be noted that the flowchart shown in FIG. 6 describes a mode in which data collection and difference-extraction processing are implemented (step S704) in a case where the device controller that has transmitted a message has determined that transmission of the message failed. In another arrangement, however, it may be so arranged that data collection and difference-extraction processing are implemented in a case where a device controller that has received a message cannot interpret the received message and transmits an error message.

Figure 7:
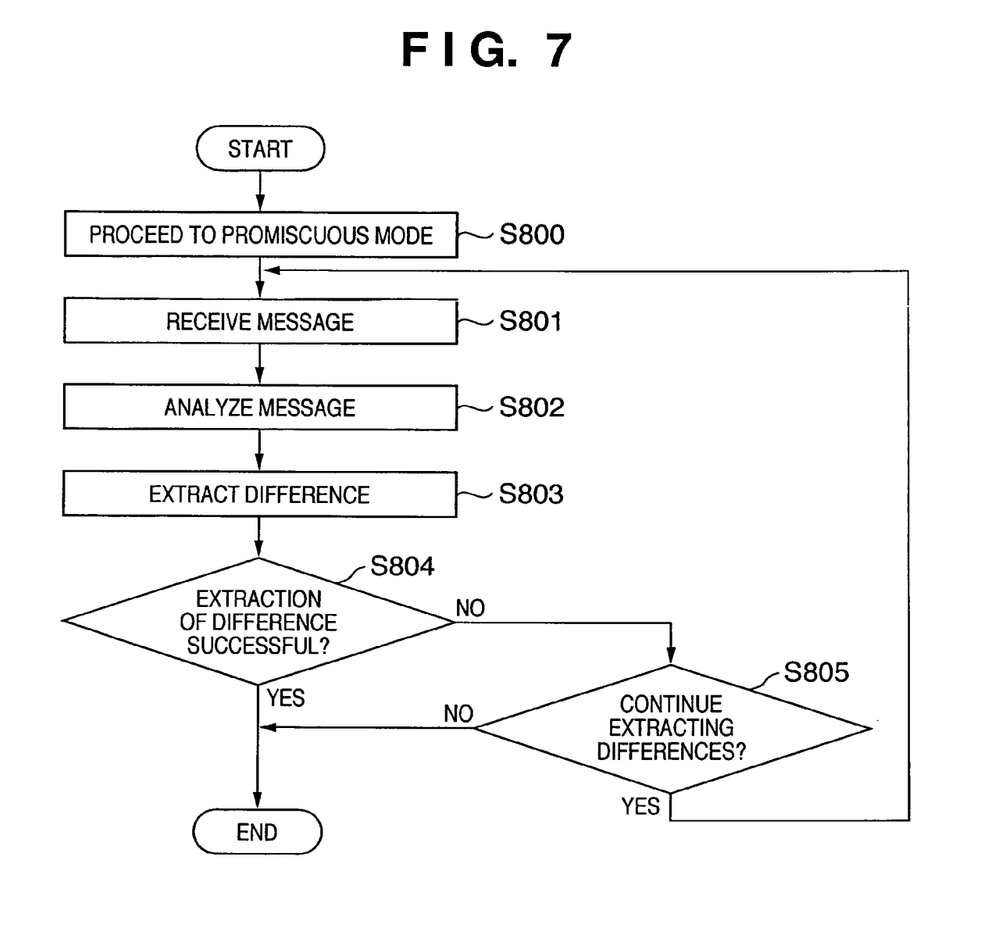
FIG. 7 is a flowchart for describing the details of data acquisition and difference-extraction processing (step S707) in the flowchart of FIG. 6.

FIG. 7 is a flowchart for describing the details of data acquisition and difference-extraction processing (step S707) in the flowchart of FIG. 6.

First, in order to receive all packets that flow over the network, the protocol data collecting unit 602c requests the message transceiver unit 603 to cause the network interface that it itself manages to operate in the promiscuous mode (step S800). A message that flows over the network is received in the message receiver 603b (step S801). It should be noted that the Internet Protocol (IP) is used when a message is received by the message receiver 603b. As for the version of the IP in this case, both IPv4 and IPv6 can be used. Further, the medium actually used as communication path can be a wired or wireless path. Depending upon the device control protocol, there are cases where a communication protocol such as TCP, UDP, HTTP, SMTP, SNMP or FTP is used.

Next, the protocol data collecting unit 602c analyzes the message received at step S801 (step S802). Furthermore, the difference extracting unit 602d extracts difference information between the device control protocol being controlled by the protocol controller 602a and the data analyzed by the protocol data collecting unit 602c at step S802 (step S803). By way of example, in a case where the device control protocol is "HTTP/1.1", the difference extracting unit 602d extracts a trivial difference such as that between the character strings "GET" and "get" on the first lines in FIGS. 3A and 3C, respectively. Further, the extracted difference information is recorded in the form of the table shown in FIG. 8.

The difference extracting unit 602d then determines whether extraction of the difference information has succeeded (step S804). If it is determined that extraction of the difference information has succeeded ("YES" at step S804), then this processing is exited and control proceeds to the processing of step S705 in FIG. 6. On the other hand, if it is determined that extraction of the difference information has failed ("NO" at step S804), then control proceeds to the processing of step S805. Here the difference extracting unit 602d determines whether data collection and difference-extraction processing are to continue or not. By way of example, the time spent collecting data or the number of times collection has been performed, etc., is adopted as the criterion used at step S805. Further, the criterion is not limited to the two mentioned; it is possible to apply any criterion.

If it is determined at step S805 that data collection and difference-extraction processing are to continue ("YES" at step S805), then control proceeds to step S801. On the other hand, if it is determined at step S805 that data collection and difference-extraction processing are to be terminated ("NO" at step S805), then this processing is exited and control proceeds to the processing of step S705 in FIG. 6.

For example, if a control command "GET" has been transmitted and an error message received, then messages having a prescribed relationship to the transmitted "GET" are collected. For example, a command "get", which has different type characters from "GET" in terms of upper-case/lower-case, is collected. If extraction of this difference (the difference in type between upper- and lower-case characters) succeeds ("YES" at step S705), then "get" is transmitted instead of "GET".

Further, in a case where an error is the result of parameters that have been added onto a command, processing is as follows: For example, on the receiving side, it is essential that HOST (Internet host and port number) and Accept-Language (the language desired as the response) that are used as the GET method of HTTP be the parameters added onto the "GET" command. In spite of this, however, if the transmitting side transmits the "GET" command to which only HOST has been added on as a parameter (i.e., Accept-Language has not been added on) and an error results, then the following occurs:

In this case, the transmitting side collects commands having a prescribed relationship to the "GET" command that resulted in the transmission error (step S704). Here a "GET" command that differs in terms of the added parameter from the "GET" command that resulted in the transmission error is collected. That is, a "GET" command onto which "HOST" and "Accept-Language" have been added as parameters is collected. If extraction of this difference in parameters succeeds, then the command can be made the "GET" command onto which "HOST" and "Accept-Language" have been added, instead of the "GET" command onto which only "HOST" has been added.

As to what should be requested as "Accept-Language", it will suffice to request the "Accept-Language" set in advance on the transmitting side. Further, it may be so arranged that the content of "Accept-Language" that has been added onto the collected "GET" command is displayed and the user is allowed to select the "Accept-Language" that is desired.

It should be noted that the transmitting side determines whether its own apparatus has the parameter (e.g., "Accept-Language") required on the receiving side. If the transmitting side determines that the parameter is one that its own apparatus does not possess, then the transmitting side aborts transmission of the message to the receiving side on the grounds that the protocol being used by the receiving side cannot be allowed. Further, in a case where there is a discrepancy in both the upper-case/lower-case characters of a command and parameters that have been added onto a command, this can be dealt with in similar fashion.

Thus, in accordance with this embodiment, as described above, it is possible to assure interconnectivity (interoperability) in a network comprising a plurality of device controllers capable of being controlled through the network using a specific device control protocol. More specifically, there are instances where interconnectivity is not assured owing to a misunderstanding in terms of packaging caused by ambiguous specifications or some other reason irrespective of the fact that the same device control protocol is being used. That is, if there is such an ambiguity is specifications, a discrepancy in interpretation can occur between vendors and interoperability may not be achieved. In such case, the present invention extracts the difference between the device control protocol being used by local device controller and the device control protocol that is effective on the network to which the connection has been made, and effects a correction by reflecting this difference in the device control protocol of the local device controller. As a result, the device control protocol after correction becomes the de facto standard in the network and interoperability can be enhanced by the local rules.

Furthermore, in a case where it has been determined that there is no interoperability between a device control protocol being used by the local control device and another device control protocol being used over the network, it is possible to track down the cause that is impeding interoperability, such as a discrepancy in the interpretation of specifications.

Although an embodiment has been described above in detail, it is possible for the present invention to take on the form of a system, apparatus, method, program or storage medium (recording medium). More specifically, the present invention may be applied to a system constituted by a plurality of devices or to an apparatus comprising a single device.

Furthermore, there are cases where the object of the invention is attained also by supplying a software program (a program corresponding to the flowcharts shown in the drawings of the foregoing embodiment), which implements the functions of the foregoing embodiment, directly or remotely to a system or apparatus, reading the supplied program codes with a computer of the system or apparatus, and then executing the program codes.

Accordingly, since the functional processing of the present invention is implemented by computer, the program codes per se installed in the computer also implement the present invention. In other words, the present invention also covers a computer program per se that is for the purpose of implementing the functional processing of the present invention.

In this case, so long as the system or apparatus has the functions of the program, the form of the program, e.g., object code, a program executed by an interpreter or script data supplied to an operating system, etc., does not matter.

Examples of recording media for supplying the program are a hard disk, optical disk, magneto-optical disk, CD-ROM, CD-R, CD-RW, magnetic tape, non-volatile memory card, ROM, DVD (DVD-ROM, DVD-R), etc.

As for the method of supplying the program, the program can also be supplied by being downloaded to a recording medium such as a hard disk from a website on the Internet using a browser possessed by a client computer. That is, the website is accessed and the computer program per se of the present invention or an automatically installable compressed file is downloaded from the website. Further, the program of the present invention can be supplied by dividing the program code constituting the program into a plurality of files and downloading the files from different websites. In other words, there are cases where a WWW server that downloads, to multiple users, the program files that implement the functions and processes of the present invention by computer also is covered by the present invention.

Further, the program of the present invention is encrypted, stored on a storage medium such as a CD-ROM and distributed to users. Users who meet certain requirements are allowed to download decryption key information from a website via the Internet. It is possible to run the encrypted program upon decrypting it using the key information, whereby the program is installed in the computer.

Further, the functions of the embodiment are implemented by having a computer execute a program that has been read. In addition, an operating system or the like running on the computer performs all or a part of the actual processing based upon the indications in the program. The functions of the embodiment can be implemented by this processing as well.

Furthermore, after the program read from the recording medium is written to a memory provided on a function expansion board inserted into the computer or provided in a function expansion unit connected to the computer, a CPU or the like mounted on the function expansion board or function expansion unit performs all or a part of the actual processing based upon the indications in the program, whereby the functions of the foregoing embodiment are implemented.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-233336, filed Aug. 11, 2005, which is hereby incorporated by reference herein in its entirety.

What is claimed is:

1. A communication apparatus comprising:
   a communicating unit configured to communicate a first message via a network to a second communication apparatus;
   a detecting unit configured to detect an error in the communication of the first message communicated by said communicating unit;
   an acquiring unit configured to acquire a second message which is communicated between the second communication apparatus and a third communication apparatus in the network;
   a determining unit configured to determine a difference between the erred first message and the acquired second message and to determine where the difference is located in the erred first message; and
   a creating unit configured to create a third message that is different from the erred first message based on the determination by said determining unit,
   wherein the third message created by the creating unit is communicated to the second communication apparatus by the communicating unit.

2. The apparatus according to claim 1, further comprising a monitoring unit configured to monitor messages which are communicated between other communication apparatuses in the network,
   wherein said acquiring unit acquires the second message which is monitored by said monitoring unit.

3. The apparatus according to claim 1, wherein said creating unit creates the third message in a message format which is different from a message format of the first message using the determination by said determining unit.

4. The apparatus according to claim 1, wherein
   said communicating unit transmits the first message to the second communication apparatus via the network;
   said acquiring unit acquires the second message which is transmitted from the third communication apparatus to the second communication apparatus; and
   said communicating unit transmits, to the second communication apparatus, a third message in which the difference between the first message and the second message has been applied by said applying unit.

5. A communication method executed by a communication apparatus, comprising the steps of:
   communicating a first message via a network to a second communication apparatus;
   detecting an error in the communication of the first message communicated by said communicating step;
   acquiring a second message which is communicated between the second communication apparatus and a third communication apparatus in the network;
   determining a difference between the erred first message and the acquired second message and determining where the difference is located in the erred message; and
   creating a third message that is different from the erred first message based on the determination in said determining step,
   wherein the third message created in the creating step is communicated to the second communication apparatus.

6. The method according to claim 5, further comprising a step of monitoring messages which are communicated between other communication apparatuses in the network,
   wherein said acquiring step acquires the second message which is monitored by said monitoring step.

7. The method according to claim 5, wherein said creating step creates the third message in a message format which is different from a message format of the first message using the determination in said determining step.

8. The method according to claim 5, wherein
   said communicating step transmits the first message to the second communication apparatus via the network;
   said acquiring step acquires the second message which is transmitted from the third communication apparatus to the second communication apparatus; and
   said communicating step transmits, to the second communication apparatus, a third message in which the difference between the first message and the second message has been applied by said applying step.

9. A communication method for a first communication apparatus in a network, comprising the steps of:
   communicating a first message which corresponds to a predetermined protocol definition via a network to a second communication apparatus;
   detecting an error in the communication of the first message communicated by said communicating step;
   acquiring a second message transmitted from the second communication apparatus to a third communication apparatus in the network;

judging whether or not the acquired second message corresponds to the predetermined protocol definition;

in a case where it is judged that the acquired second message does not correspond to the predetermined protocol definition, determining a difference between the erred first message and the acquired second message and determining where the difference is located in the erred first message;

creating a third message that is different from the erred first message based on the difference and the location determined in the determining step; and communicating the created third message to the second communication apparatus.

10. The method according to claim 9, wherein said creating step creates the third message in a message format which is different from a message format of the first message using the determination in said determining step.

11. The method according to claim 9, wherein said communicating step transmits the first message to the second communication apparatus via the network; and said communicating step transmits, to the second communication apparatus, a third message in which the difference between the first message and the second message has been applied by said applying step.

12. A communication apparatus comprising:

a communicating unit configured to communicate a first message via a network to a second communication apparatus;

an acquiring unit configured to acquire a second message which is communicated between the second communication apparatus and a third communication apparatus in the network;

a determining unit configured to determine a difference between the erred first message and the acquired second message and to determine where the difference is located in the erred first message; and an creating unit configured to create a third message that is different from the first message based on the determination by said determining unit, wherein the communication unit communicates the created third message to the second communication apparatus.

13. A communication apparatus comprising:

a communicating unit configured to communicate messages with a second communication apparatus via a network;

a detecting unit configured to detect an error in communication of a first message communicated by said communicating unit;

an acquiring unit configured to acquire a second message which is transmitted from a second communication apparatus;

a determining unit configured to determine a difference between the erred first message and the acquired second message and to determine where the difference is located in the erred first message; and a creating unit configured to create a third message that is different from the erred first message based on the determination by said determining unit, wherein the communicating unit communicates the created third message with the second communication apparatus.

* * * * *